April 11, 1961 C. EAMES Re. 24,964

FURNITURE FRAME CONSTRUCTION

Original Filed Dec. 6, 1952 3 Sheets-Sheet 1

INVENTOR
CHARLES EAMES
BY
Curtis, Morris & Safford.
ATTORNEYS

FURNITURE FRAME CONSTRUCTION

Original Filed Dec. 6, 1952 3 Sheets-Sheet 2

INVENTOR
CHARLES EAMES
BY
Curtis, Morris & Safford
ATTORNEYS

FURNITURE FRAME CONSTRUCTION

Original Filed Dec. 6, 1952 3 Sheets-Sheet 3

INVENTOR
CHARLES EAMES
BY
Curtis, Morris & Safford.
ATTORNEYS

United States Patent Office

Re. 24,964
Reissued Apr. 11, 1961

24,964

FURNITURE FRAME CONSTRUCTION

Charles Eames, Venice, Calif., assignor to Herman Miller, Inc., a corporation of Michigan Original No. 2,708,476, dated May 17, 1955, Ser. No. 324,518, Dec. 6, 1952. Application for reissue May 14, 1957, Ser. No. 659,458

8 Claims. (Cl. 155—187)

Matter enclosed in heavy brackets [ ] appears in the original patent but forms no part of this reissue specification; matter printed in italics indicates the additions made by reissue.

The present invention relates to an improvement in metal furniture frames and method of making the same. An object of said invention has been to produce a lightweight steel wire shell or frame for chairs, or the like, which will have inherent curved contours conforming generally to body contours of persons in sitting or reclining positions thereon. A further object has been to provide a lightweight metal shell or furniture frame which is particularly well adapted for use with pre-formed inherently contoured upholstery of a readily attachable and detachable type. A further object has been to provide a frame of the character indicated and which may conveniently and advantageously be mounted or supported upon bases of widely varied materials, construction, and designs. A further object has been to provide a type of furniture frame which can be nested one upon another and shipped with substantial economy, both in packing and shipping, over other types of furniture.

An object of the present invention, so far as it involves method, is to provide procedures whereby wire mesh skeleton furniture frames or shells can be made advantageously under mass production conditions. It is also contemplated that said method, as applied to said product, insures uniformly effective results in the durability and appearance thereof.

Figure 1:
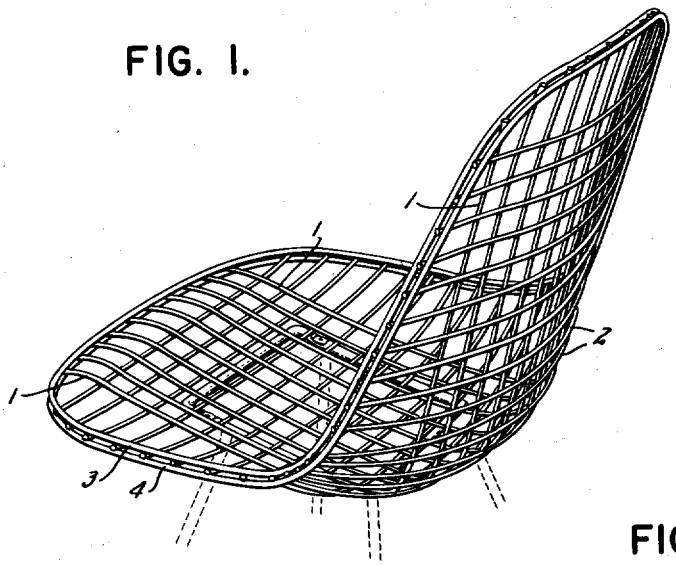
Figure 2:
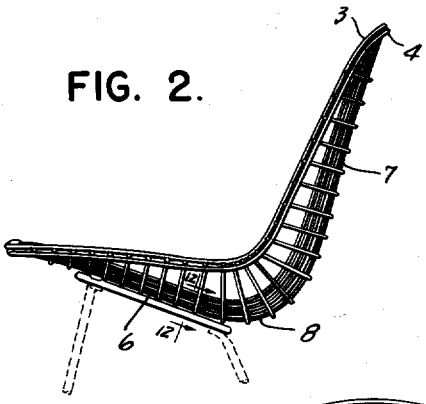
Figure 3:
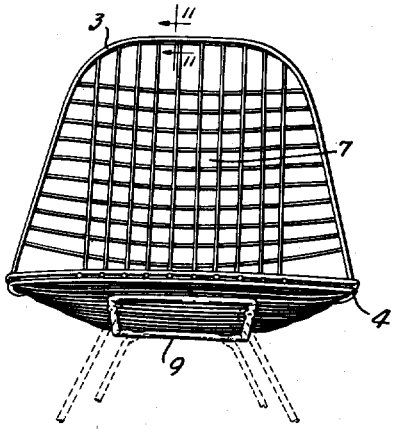
Figure 4:
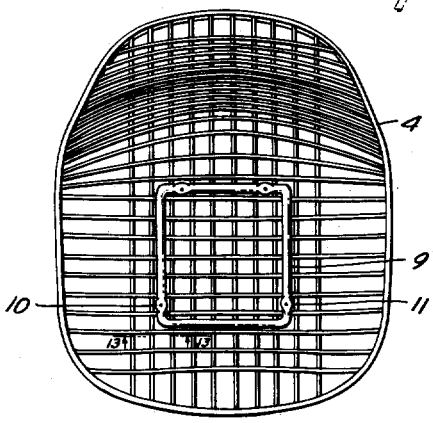
Figure 5:
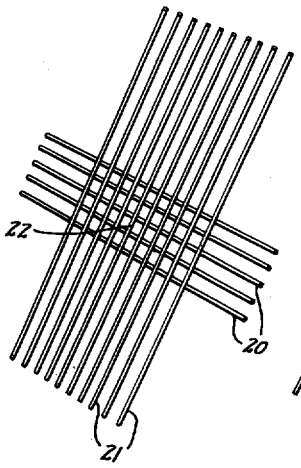
Figure 6:
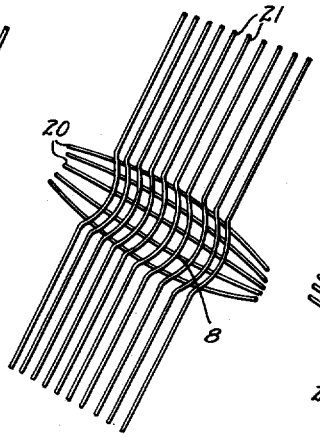
Figure 7:
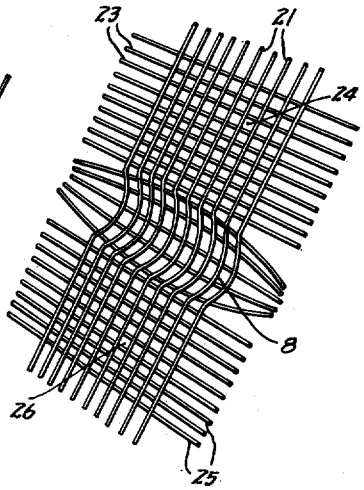
Figure 8:
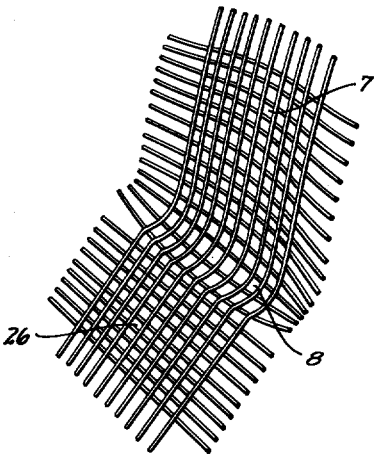
Figure 9:
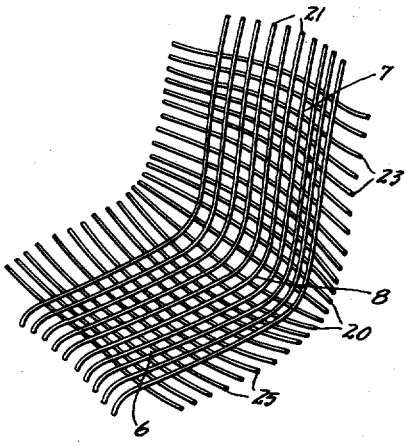
Figure 10:
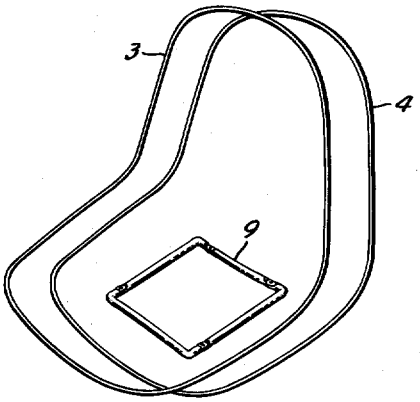
Figure 11:
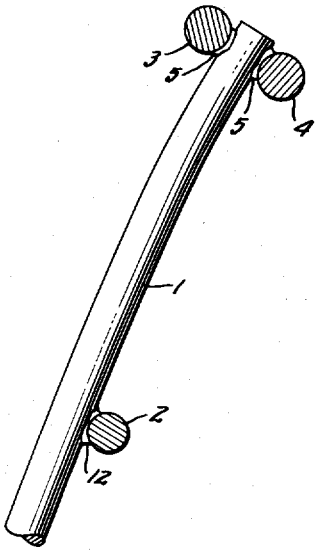
Figure 12:
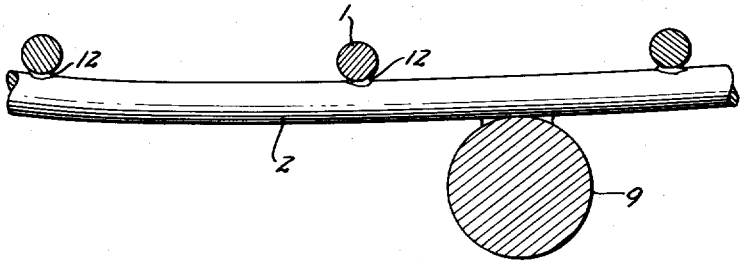
Figure 13:
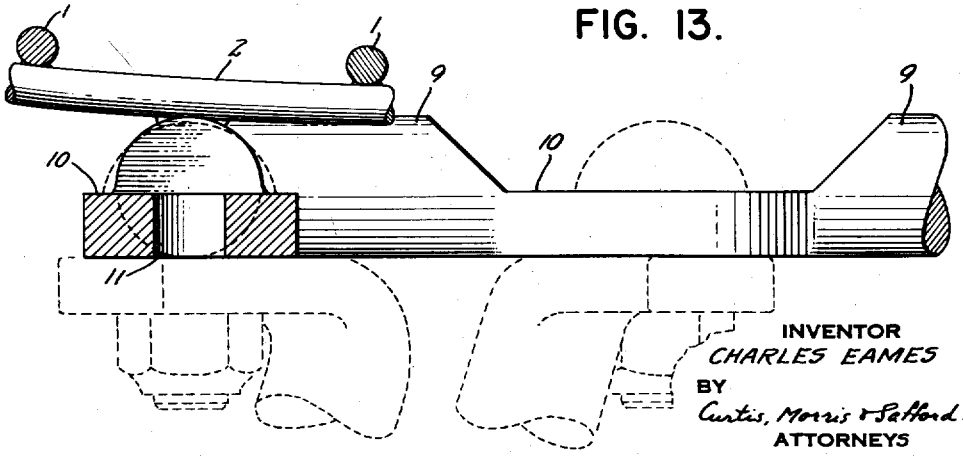

Further objects of and advantages inherent in the present invention will in part appear from the following specification and the appended drawings wherein:

Figure 1 is a view in perspective of a chair frame embodying my invention;

Figure 2, a side elevation thereof;

Figure 3, a front elevation thereof;

Figure 4, a bottom plan view thereof;

Figure 5, a view in perspective showing an initial arrangement of crossed lengths of wire stock welded together at their intersections to form a flat intermediate grid or mesh;

Figure 6, a view in perspective of said grid after deformation by drawing and pressure;

Figure 7, a view in perspective of said initial grid with additional cross wires welded to the longitudinal wires at both sides of the deformed grid to form a seat grid and a back grid;

Figure 8, a view in perspective of the assembled wires with the back grid deformed;

Figure 9, a view in perspective of the assembled wires with the seat grid deformed;

Figure 10, a view in perspective with parts in exploded relation illustrating the peripheral wires and the fastening ring;

Figure 11, an enlarged fragmentary view partly in section on the line 11—11 of Figure 3;

Figure 12, an enlarged fragmentary view partly in section on the line 12—12 of Figure 2; and Figure 13 is an enlarged fragmentary view partly in section on the line 13—13 of Figure 4.

The invention, so far as it relates to a skeleton typ metal furniture frame or shell construction, resides in combination wherein a plurality of lengths of wire ar ranged in crossed relation with another plurality o lengths of wire and welded thereto at their intersection provide a mesh or grid-like body support with portions o the mesh distorted to form compound curved sectiona contours conforming in general to body contours of person in seated or reclining position thereon, and perimeter wire or rim member extends across and i welded to end portions of said lengths of wire.

The method of the present invention includes the step of welding intermediate portions of cross wires to inter mediate portions of longitudinal wires to form a flat mesl or grid, applying die pressure to said flat mesh to draw o elongate portions of the wires thereof and distort th same to form a mesh of compound curved sectional con tour, welding additional sets of cross wires to other por tions of said longitudinal wires to form a flat seat mesl portion and a flat back mesh portion, and applying de forming die pressure to said additional flat portions t produce back and seat mesh portions having inheren compound curved sectional contours.

One form of furniture frame according to the presen invention and as shown in the drawings, includes a com posite body-supporting element or shell formed primaril of metal strands, as wire or rod stock, and having inheren body-conforming contours. Such a shell comprises lon gitudinal wires 1 and transverse wires 2 preferably of 1 gauge steel wire with intermediate portions of wires arranged across and welded to intermediate portions o wires 2, as at 12, Figures 11 and 12 to form a mesh o grid of compound curved contours. End portions o said wires are secured, as by welding, to a metal rim con sisting of an upper wire member 3 and a lower wire mem ber 4, Figures 1 and 2, both preferably of 5 gauge stee wire, welded to the mesh-forming wires at 5, Figure 11 A shell construction intended more particularly for use a a chair frame, includes a curved seat mesh or grid sec tion, as 6, and a curved back mesh or grid section, as 7 between which is an intermediate curved grid portion 8 Figure 2. The wires in said sections are expanded o elongated in varying degrees and the meshes are corre spondingly distorted to form a curved shell which pro vides body conforming contours, Figure 4.

A fastening or securing element, as a ring 9 of suitabl rod or wire stock, as 2 gauge, is provided with means fo accommodating fastening bolts, or the like by which th frame may be mounted on and securely attached to suitable base. As shown in Figures 4 and 13, ring 9 ha spaced flattened portions 10 which are provided with bolt receiving holes 11, said flattened portions being adapte to receive and support flat top end portions of legs o other base members, shown in dotted lines, Figure 1 conventionally provided with bolt holes which come op posite said holes 11 when the frame and the base ar assembled.

The shell construction above described provides lightweight but sturdy chair frame, or the like, which i contoured to conform in general to body contours of pe sons in sitting or reclining positions thereon. Also, th rim, besides functioning as a strength imparting elemen provides a peripheral lip which retains in position a ce tain type of upholstery pad provided with a marginal a taching band having a wire ring enclosed in an edg pocket thereof which, however, forms no part of th present invention. A further advantage of the above described frame construction in use is that it may be em ployed advantageously with any one of various types c supporting bases.

A practical method of making a furniture frame c shell according to the present invention includes cuttin wire strands or rods of 10 gauge steel wire stock to the required lengths and arranging a plurality of them as transverse members 20 in crossed relation to a plurality of longitudinal members 21, Figure 5. These are welded together at their intersections to form the flat mesh or grid, as 22. Said grid is placed between suitable dies, preferably hydraulically actuated, one of which presents generally convex curved surfaces and the other, generally concave curved surfaces conforming thereto. The effect of applying dies pressure to said grid 22 while engaged between said dies is to draw and thus elongate portions of wires 20 in a transverse direction and portions of the wires 21 in a longitudinal direction, the extent of such elongation being greater at mid-portions and less at edge portions of said grid 22. Said elongation distorts the meshes of grid portion 22 and forms the curved contour intermediate grid portion 8, Figures 2 and 6, imparting thereto a permanently curved compound sectional contour.

Additional transverse wires 23, Figure 7, are applied crosswise and welded to said longitudinal wires 21 at their intersections to provide an initially flat back portion grid 24; and additional transverse wires 25 are applied crosswise and welded to said cross wires 21 at their intersections to provide an initially flat seat portion grid 26. Said seat and back portion flat grids are placed between dies having appropriately curved shaping surfaces and are subjected to drawing pressure such that the flat grid meshes thereof are distorted in varying degrees as said seat and back portions are die pressed into curved sectional contours, which form said compound curved contour seat grid 6 and said compound curved contour back grid 7, Figures 2 and 9.

The upper and lower perimeter or rim wire rings 3 and 4 are applied to and across outer end portions of the mesh or grid-forming wires 20, 21, 23 and 25 and are welded thereto at their respective intersections, as 5, Figure 11; and free end portions, if any, of said wires which extend outwardly beyond said perimeter or rim wires are trimmed off to provide a finished frame edge.

The chair frame is completed by welding the securing or attaching ring 9 to under portions of the crossed wires forming the curved seat grid 6.

The above-described method permits mass production of said wire frames or shells at relatively low cost and insures uniformity in their style, construction and durability factors.

I claim:

1. Furniture frame comprising a plurality of longitudinal wires and a plurality of transverse wires having portions welded in crossed relation to form a body supporting mesh with portions of said mesh deformed to provide in effect a body supporting member of inherent curved contour, and an upper rim wire welded to upper surfaces and a lower rim wire welded to lower surfaces of end portions of said longitudinal and transverse wires.

2. Furniture frame according to claim 1 and including a fastening ring secured to a portion of the underside of said mesh.

3. Furniture frame comprising a plurality of spaced apart longitudinal wires, a plurality of spaced apart transverse wires in cross contiguous relation thereto and welded to said longitudinal wires at their points of contact to form a body conforming and supporting mesh which provides a back portion inherently curved outwardly from its periphery and a seat portion inherently curved downwardly from its periphery, an upper rim member welded to upper surfaces and a lower rim member spaced from said upper rim member and welded to lower surfaces of end portions of said longitudinal and transverse wires to provide a peripheral rim which interconnects the outer ends of said wires.

4. Furniture frame according to claim 3 and including means secured to the under side of the seat portion of said mesh for attaching frame supported legs thereto.

5. Furniture frame according to claim 3 and wherein a portion of the mesh between said back and said seat has openings of greater extent than those in said other portions of the mesh.

6. Furniture frame according to claim 3 and wherein said upper rim member and said lower rim member are endless wires arranged in substantially parallel spaced relation peripherally around said body supporting mesh.

*7. A chair or the like comprising a seat-and-back unit for supporting the body of a person, said unit including a continuous wire frame extending around the periphery of the unit, and a network including a first plurality of generally parallel wires attached at their ends to and spanning said frame, a second plurality of generally parallel wires attached at their ends to and spanning said frame and crossing said first plurality of wires at substantial angles and welded connections between said wires at the crossing thereof, said network being contoured to form a seat portion, a back portion, and a curved portion of substantial radius joining said seat portion and said back portion; and a support for said seat-and-back unit and means connecting said support to said network inwardly of said frame and providing the only support for the unit.*

*8. A chair or the like comprising a seat-and-back unit for supporting the body of a person, said unit being an integral, resiliently flexible network consisting of a rim extending around the periphery of the network, a first plurality of generally parallel wires extending across said network from one side to the other and being attached at their ends to said rim, a second plurality of generally parallel wires crossing said first plurality of wires at substantial angles, said second plurality of wires also extending across said network from one side to the other and being attached at their ends to said rim, and welded connections between said wires at the crossings thereof, said network having an unstressed contour conforming generally to the contour of the body of a seated person, and including a seat portion curving upwardly from the center toward the sides, a back portion curving forwardly from the center toward the sides, and a portion of compound curvature of substantial radius smoothly joining the seat portion and the back portion; a base for said seat-and-back unit and means connecting said base to said network only at localities inwardly of said rim, so that all stresses due to loads on said seat-and-back unit are transferred through the network and the connecting means to the base.*

References Cited in the file of this patent or the original patent

UNITED STATES PATENTS

| | | |
|---|---|---|
| 400,292 | Bolus | Mar. 26, 1889 |
| 980,602 | Clark | Jan. 3, 1911 |
| 1,580,522 | Murray | Apr. 13, 1926 |
| 1,694,293 | Trudo | Dec. 4, 1928 |
| 2,000,788 | Reed | May 7, 1935 |
| 2,111,426 | Hilbert | Mar. 15, 1938 |
| 2,265,321 | Smith | Dec. 9, 1941 |